Sept. 2, 1969  R. L. DOBRIN  3,464,341

DAMPER CONSTRUCTION FOR VENTILATOR DUCT

Filed Oct. 18, 1967  2 Sheets-Sheet 1

Russell L. Dobrin
INVENTOR.

BY *Clarence A. O'Brien*
and *Harvey B. Jacobson*
Attorneys

Sept. 2, 1969  R. L. DOBRIN  3,464,341
DAMPER CONSTRUCTION FOR VENTILATOR DUCT
Filed Oct. 18, 1967  2 Sheets-Sheet 2

Russell L. Dobrin
INVENTOR.

BY Clarence A. O'Brien
and Harvey B. Jacobson
Attorneys

United States Patent Office 3,464,341
Patented Sept. 2, 1969

---

3,464,341
DAMPER CONSTRUCTION FOR VENTILATOR DUCT
Russell L. Dobrin, Edison, N.J.
(P.O. Box 144, Linden, N.J. 07036)
Filed Oct. 18, 1967, Ser. No. 676,242
Int. Cl. F24f *13/08;* E05f *17/00*
U.S. Cl. 98—110                                                13 Claims

ABSTRACT OF THE DISCLOSURE

A structure for variably closing a ventilation opening or a ventilation duct and including pairs of elongated and adjacent side by side flap members totaling either an even or odd number of flap members with the flap members of each pair of flap members pivotally supported at adjacent side edge portions for oscillation about axes paralleling the edge portions and each other, the flap members of each pair of flap members being interconnected for inverse oscillation and corresponding flap members of said pairs of flap members being interconnected for like and simultaneous oscillation.

---

The damper of the instant invention includes oscillatable flap members supported in pairs of adjacent flap members with the flap members of each pair of flap members being disposed in relatively good airtight sealed engagement with each other and the free swinging edge portions of the flap members of pairs of adjacent flap members being swingable into substantially airtight engagement with each other. The flap members are supported from side frame members between which the flap members extend and the end edge portions of the flap members include surface portions disposed in relatively good airtight sealed engagement with the opposing surface portions of the adjacent side frame members. In this manner, the damper may be actuated to substantially fully close an associated opening or duct with very little leakage of air past the oscillatable flap members of the damper.

The main object of this invention is to provide a damper assembly for a ventilation opening or duct and which will be operable to not only variably close the opening from a substantially fully open condition but which will also be operable to substantially fully close the ventilation opening in a manner such that very little leakage of air past the damper through the opening or duct is allowed when the damper is closed.

Another object of this invention, in accordance with the immediately preceding object, is to provide a damper that may be readily constructed from various relatively inexpensive materials.

A still further object of this invention is to provide a damper whose components need only be slightly modified in size and number so as to provide a damper for substantially any size opening.

A final object of this invention to be specifically enumerated herein is to provide a damper which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
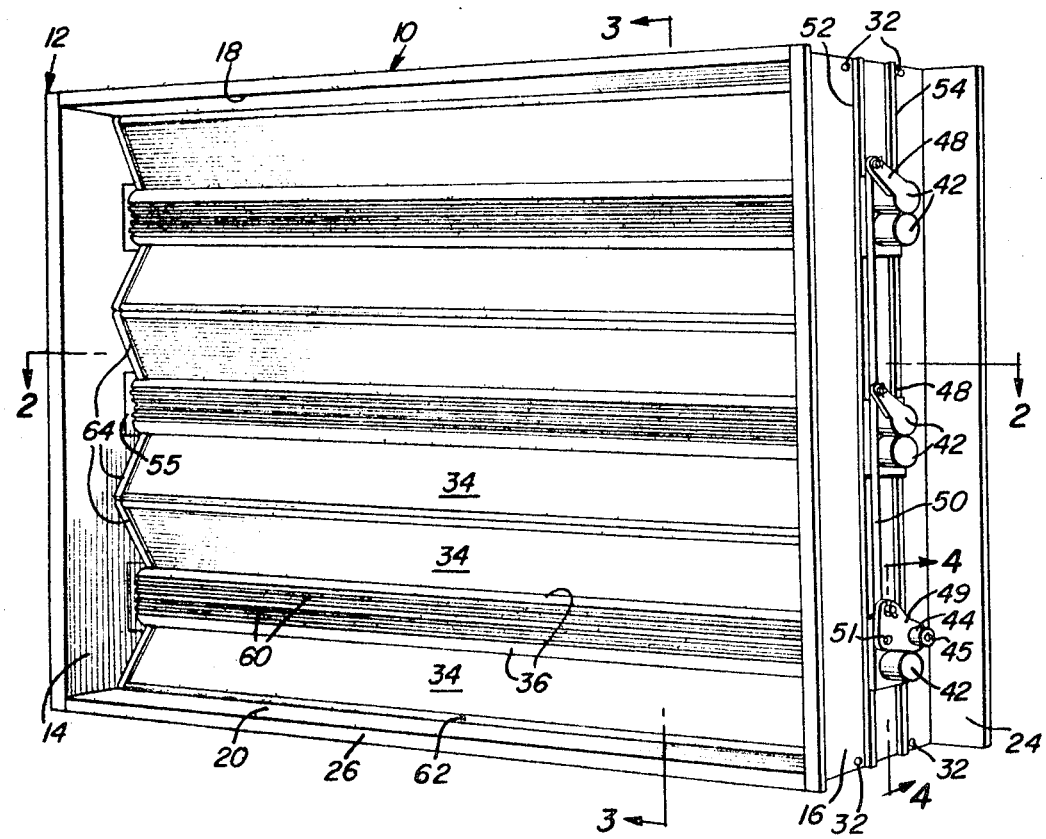
FIGURE 1 is a perspective view of a damper assembly constructed in accordance with the present invention.

Referring now more specifically to the drawings the numeral 10 generally designates the damper structure which includes a support frame generally referred to by the reference numeral 12 consisting of a pair of upstanding opposite side members 14 and 16 interconnected at their upper and lower ends by means of upper and lower transverse members 18 and 20. Two opposite side members 14 and 16 include longitudinal edge portions including laterally directed flanges 22 and 24 and the upper and lower transverse members 18 and 20 include longitudinal edge portions provided with similar flanges 26 and 28. Further, the transverse members 18 and 20 also include somewhat resilient members 30 which are generally C-shaped in cross-section and with which threaded screws 32 secured through the upper and lower ends of the side members 14 are threadedly engaged. In this manner, the transverse members 18 and 20 are secured between the upper and lower ends of the side members 14 and 16.

The structure 10 includes a plurality of pairs of elongated and adjacent side by side flap members 34 with the flap members of each pair of flap members pivotally supported at adjacent side edge portions from the side members 14 and 16 for oscillation about axes generally paralleling the adjacent side edge portions and each other. The flap members 34, as will be hereinafter more fully set forth, are interconnected in a manner such that the flap members of each pair of flap members are interconnected for inverse oscillation and corresponding flap members of the pairs of flap members are interconnected for like and simultaneous oscillation.

Figure 4:
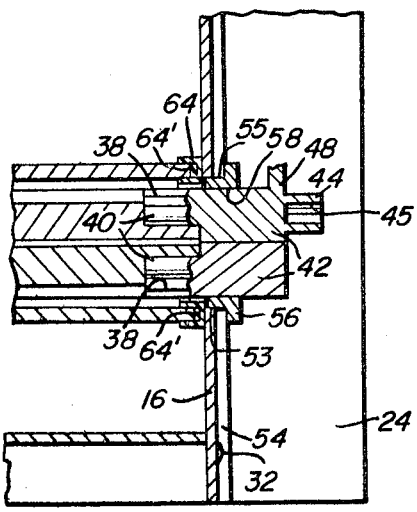
FIGURE 4 is a fragmentary enlarged vertical sectional view taken substantially upon the plane indicated by the section line 4—4 of FIGURE 1.
Figure 5:
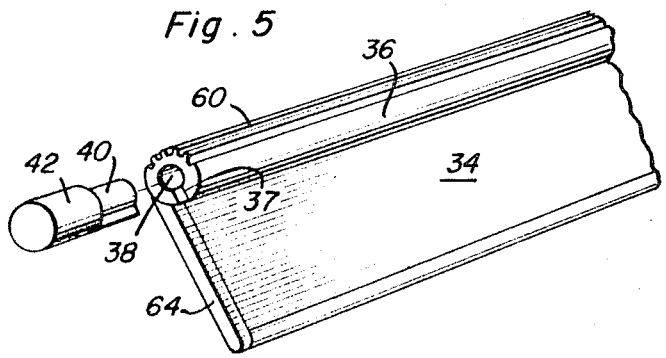
FIGURE 5 is a fragmentary perspective view of one of the flap members of the damper assembly.
Figure 6:
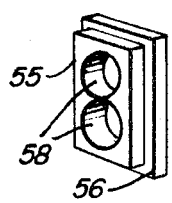
FIGURE 6 is a perspective view of one of the journal structures by which corresponding ends of a pair of the flap members may be journaled from the side frame members of the damper structure.

Each of the flap members 34 may be constructed of extruded aluminum and includes a generally cylindrical portion 36 and each cylindrical portion 36 includes a longitudinal groove or slot 37 into whose opposite end portions a pair of opposite end endwise outwardly opening non-circular openings or recesses 38 are formed. A keyed or ribbed reduced shaft portion 40 of a journal plug 42 is received in each recess and one of the journal plugs 42 is provided with an axial projection 44 having a non-circular recess 45 formed therein, see FIGURES 1 and 4, in which a non-circular end portion of an operating crank (not shown) may be engaged. Two of the journal plugs 42 include integral lever portions 48 and a third journal plug 42 includes a similar lever portion 49. The lever portions 48 and 49 are interconnected by means of a connecting bar 50 to which the free ends of the lever portions 48 and 49 are pivotally secured in any convenient manner.

The side members 14 and 16 include longitudinally extending stiffening ribs 52 and 54 and the area between the stiffening ribs 52 and 54 of each side member 14 and 16 has three openings 53 formed therein which have a cross-sectional shape similar to the rectangularly shaped laterally projecting boss portions 55 of corresponding journal plates 56 and in which the boss portions 55 are received. The journal plates 56 may be constructed of any suitable material such as nylon or brass and the boss portions 55 each define a pair of sleeve portions 58 in which to rotatably journal the journal portions 42 carried by the corresponding ends of one pair of adjacent flap members 34.

The cylindrical portions 36 of each pair of adjacent flap members 34 are provided with longitudinally extending gear teeth 60 meshed with each other in a manner so as to form a relatively good airtight seal between the adjacent cylindrical portions 36. Also, because of the meshed engagement of the teeth 36, the flap members of each pair of flap members are interconnected for inverse oscillation.

The free swinging edge portions of the flap members 34 are provided with air sealing means 62 of any suitable type whereby a reasonably good airtight seal may be formed between the free swinging edge portions of adjacent flap members 34 of adjacent pairs of flap members 34. Further, the end edge portions of each of the flap members 34 includes additional seal means 64 whereby a relatively good airtight seal is formed between the end edges of the flap members 34 and the confronting surfaces of the side members 14 and 16.

Figure 3:
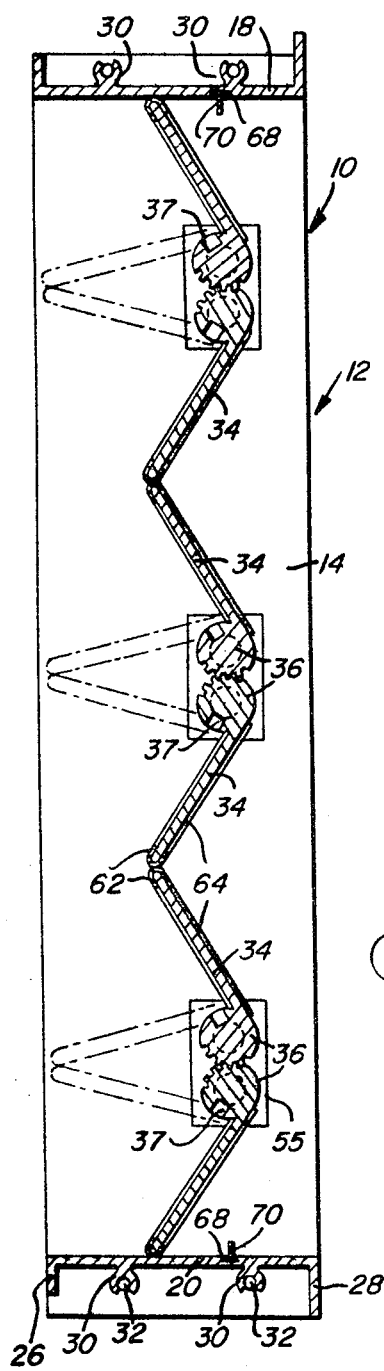
FIGURE 3 is an enlarged vertical sectional view taken substantially upon the plane indicated by the section line 3—3 of FIGURE 1.

It will be noted from FIGURE 3 of the drawings that the side members 14 and 16 are of a width sufficient to enable full contact of the seal means 64 carried by the end edges of the flap members 34 with the opposing surface portions of the side members 14 and 16 throughout oscillation of the flap members from their closed positions illustrated in solid lines in FIGURE 3 of the drawings to their fully open positions illustrated in phantom lines in FIGURE 3 of the drawings.

The flap members 34, when open, are disposed with the seal means 62 of the flap members of each pair of adjacent flap members in contact with each other as illustrated in phantom lines in FIGURE 3 of the drawings and inasmuch as the direction of flow of air through the structure 10 is to be from the left to the right when viewing the structure 10 as illustrated in FIGURE 3, there is little resistance to the free flow of air through the structure 10. Further, it will be noted that the free swinging edge portions of the uppermost and lowermost flap members 34 are positioned with their seal means 62 in contact with the transverse members 18 and 20 when the flap members 34 are in their closed positions.

The frame 12 may be constructed of any suitable material such as extruded aluminum and the journal portions 42 may be constructed of any suitable material which will allow ready oscillation of the journal portions 42 relative to the journal plates 56.

Figure 2:
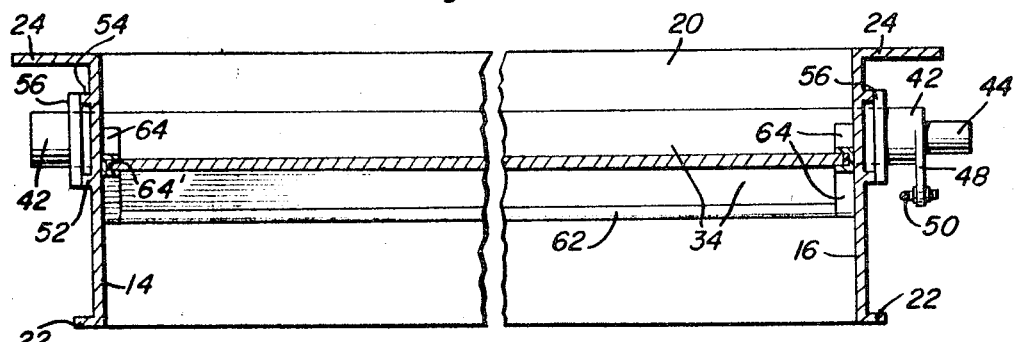
FIGURE 2 is a horizontal sectional view taken substantially upon the plane indicated by the section line 2—2 of FIGURE 1 and with portions of the damper assembly broken away.

In addition to the seal members 62 carried by the free swinging edge portions of the flap members 34, the seal members 64 carried by the end edges of the flap members 34 serve to substantially eliminate any leakage of air past the flap members 34 when the latter are in the closed positions. The seal members 62 and 64 may be constructed of any suitable material such as nylon or Teflon and the opposing surfaces of the side members 14 and 16 are parallel and disposed normal to the axes of rotation of the flap members 34. In this manner, the seal members 64 are maintained in constant air sealing engagement with the confronting surfaces of the side members 14 and 16 and as soon as the flap members 34 are pivoted to the positions thereof illustrated in FIGURE 3 of the drawings the opening defined between the side members 14 and 16 and the upper and lower transverse members 18 and 20 is substantially completely closed against leakage of air therethrough; from FIGURE 2 of the drawings it may be seen that the generally channel-shaped seal members 64 have foam plastic 64' or other resilient means disposed therein serving to yieldingly urge the seal members 64 into engagement with the opposing surfaces of the side members 14 and 16.

The over-all height of the structure 10 may be varied in increments other than the width of the flap members by merely changing the angle of orientation of the flap members when the latter are closed. This enables a single width flap member to be employed with various height damper structures by custom vertical positioning of the bearing blocks or journal plates 56.

The lever 49 includes an opening 51 formed therethrough in which a hooked end of a rod or the like may be engaged to effect oscillation of the lever 49 and therefore also oscillation of the levers 48 when the damper structure 10 is disposed in or supported from a wall structure having a ventilation opening therein. Such a hooked rod (not shown) may be readily engaged in the opening 51 to adjust the flap members 34 of the structure 10 whenever desired, it being understood that the damper structure 10 has been primarily designed for installations which will require very infrequent adjusting of the flap members 34. Further, should the structure 10 be mounted within a ventilation duct, one wall portion of the duct in alignment with the non-circular recess 45 may have an opening formed therein through which a suitable operating rod having a complementary non-circular end portion may be inserted and seated within the recess 45 so as to provide a means whereby the flap members 34 may be adjusted from the exterior of a ventilation duct in which the damper structure 10 is disposed.

Although the damper structure has been illustrated as including an even number of flap members 34, if the side members 14 and 16 are lengthened or shortened, an extra flap member 34 may be operatively mounted above or below the uppermost or lowermost flap member. Of course, such an additional flap member, when in the closed position, would have its free edge portion disposed in relatively good airtight relation with the free edge portion of the adjacent flap member. Further, each of the upper and lower transverse members 18 and 20 includes a dovetailed groove 68 in which the transversely widened base edge portion of a resilient sealing strip 70 is seatingly engaged. The sealing strips 70 include flexible free end portions which are operative to form a relatively good airtight seal with the cylindrical portion 36 of an additional flap member 34 disposed either adjacent the transverse member 18 or the transverse member 20.

As previously set forth, the flap members 34 may be constructed of extruded aluminum. Of course, during the process of forming the flap members 34 by extrusion methods, the groove or slot 37 as well as the teeth 60 may be formed as the flap member 34 is being extruded. Then, in order to provide a means whereby the journal plugs 42 may be keyed to the cylindrical portions 36, the cylindrical bores or recesses 38 may be formed in the ends of the cylindrical portions 36 and be of sufficient diameter so as to open into the adjacent ends of the slots 37. In this manner, a keyed or ribbed reduced shaft portion such as shaft portion 40 may be readily keyed to each cylindrical portion 36.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a structure defining an air passage extending therethrough, pairs of elongated and adjacent side by side flap members operatively associated with said structure and with the flap members of each pair of flap members pivotally supported at adjacent side edge portions from said structure for oscillation about axes paralleling said edge portions and each other and extending transversely through said passage, the flap members of each pair of flap members being interconnected for inverse oscillation and corresponding flap members of said pairs of flap members being interconnected for like and simultaneous oscillation.

2. The combination of claim 1 wherein said structure includes generally parallel side frame members from and between which said flap members are supported for oscillation and extend, respectively, said frame members being adapted for support from a wall structure in which a ventilation opening is formed or in a ventilation duct with said flap members positioned so as to be operative to close said opening or duct to the passage of air therethrough.

3. The combination of claim 1 wherein the distance between adjacent pairs of flap members is less than the combined effective width of said flap members.

4. The combination of claim 1 wherein said structure includes generally parallel side frame members from and between which said flap members are supported for oscillation and extend, respectively, said frame members being adapted for support from a wall structure in which a ventilation opening is formed or in a ventilation duct with said flap members positioned so as to be operative to close said opening or duct to the passage of air therethrough, said side frame members including opposing surface portions extending along said side frame members, said flap members including end edge portions disposed in at least reasonably good airtight relation with said opposing surface portions when said flap members are oscillated toward their closed positions.

5. The combination of claim 4 wherein the adjacent side edge portions of the flap members of each pair of flap members include at least partial cylindrical surface portions coaxial with the axes about which said flap members are oscillatable and disposed in at least reasonably good airtight relation with each other.

6. The combination of claim 5 wherein the free swinging edge portion of the adjacent flap members of adjacent pairs of flap members include surface portions swingable with said flap members are supported for oscillation and extend, respectively, said frame members being adapted for support from a wall structure in which a ventilation opening is formed or in a ventilation duct with said flap members positioned so as to be operative to close said opening or duct to the passage of air therethrough, said side frame members having corresponding aligned openings formed therein at points spaced therealong, a plurality of journal members including portions disposed in said openings each defining a pair of tangentially joined parallel bores, each pair of bores rotatably receiving coaxial end portions carried by the adjacent ends of the corresponding pair of adjacent flap members.

7. The combination of claim 1 including generally parallel side frame members from and between which said flap members are supported for oscillation and extend, respecively, said frame members being adapted for support from a wall structure in which a ventilation opening is formed or in a ventilation duct with said flap members positioned so as to be operative to close said opening or duct to the passage or air therethrough, said side frame members having corresponding aligned openings formed therein at points spaced therealong, a plurality of journal members including portions disposed in said openings each defining a pair of tangentially joined parallel bores, each pair of bores rotatably receiving coaxial end portions carried by the adjacent ends of the corresponding pair of adjacent flap members.

8. The combination of claim 7 wherein said coaxial end portions are removably supported from said flap members.

9. The combination of claim 7 wherein said side frame members include opposing surface portions extending along said side frame members, said flap members including end edge portions disposed in at least reasonably good airtight relation with said opposing surface portions when said flap members are oscillated toward their closed positions.

10. The combination of claim 9 wherein the free swinging edge portions of the adjacent flap members of adjacent pairs of flap members include surafce portions swingable with said flap members into contacting and reasonably good airtight engagement with each other.

11. A structure for variably closing a ventilation opening including pairs of elongated and adjacent side by side flap members with the flap members of each pair of flap members pivotally supported at adjacent side edge portions for oscillation about axes paralleling said edge portions and each other, the flap members of each pair of flap members being interconnected for inverse oscillation and corresponding flap members of said pairs of flap members being interconnected for like and simultaneous oscillation, the adjacent side edge portions of the flap members of each pair of flap members including at least partial cylindrical surface portions coaxial with the axes about which said flap members are oscillatable and disposed in at least reasonably good airtight relation with each other.

12. The combination of claim 11 wherein said cylindrical surface portions include longitudinally extending gear teeth disposed in meshed relation and by which the flap members of each pair of flap members are interconnected for inverse oscillation.

13. The combination of claim 11 wherein the flap members of each pair of flap members, when the flap members are disposed in generally parallel spaced side-by-side relation, extend outwardly from the corresponding partial cylindrical surface portions generally along lines tangent to diametrically opposite sections of said partial cylindrical surface portions and said flap members are movable to full open positions with the free edge portions of the flap members of each pair of flap members contacting each other.

References Cited

UNITED STATES PATENTS 83,062   10/1968   Hover _____ 49—107
3,084,715   4/1963   Scharres _____ 98—110

MEYER PERLIN, Primary Examiner

U.S. Cl. X.R.

49—107; 98—121